(12) United States Patent
Suzuki

(10) Patent No.: US 6,731,577 B2
(45) Date of Patent: May 4, 2004

(54) INFORMATION RECORDING APPARATUS, INFORMATION RECORDING SYSTEM AND INFORMATION RECORDING MEDIUM

(75) Inventor: Ryoichi Suzuki, Kanagawa (JP)

(73) Assignee: Ricoh Company, Ltd. (JP)

( * ) Notice: Subject to any disclaimer, the term of this patent is extended or adjusted under 35 U.S.C. 154(b) by 0 days.

(21) Appl. No.: 10/434,123

(22) Filed: May 9, 2003

(65) Prior Publication Data

US 2003/0193856 A1 Oct. 16, 2003

Related U.S. Application Data

(63) Continuation of application No. 09/862,325, filed on May 23, 2001, now Pat. No. 6,594,207.

(30) Foreign Application Priority Data

May 26, 2000 (JP) ........................................ 2000-155582

(51) Int. Cl.[7] .................................................. G11B 7/00
(52) U.S. Cl. .................. 369/47.33; 369/47.1; 369/47.3; 369/47.11
(58) Field of Search ............................. 369/47.1, 47.11, 369/47.28, 47.29, 47.3, 47.32, 47.33, 53.1, 59.1

(56) References Cited

U.S. PATENT DOCUMENTS

| | | | |
|---|---|---|---|
| 5,504,728 A | 4/1996 | Yokota et al. | |
| 5,758,174 A | 5/1998 | Crump et al. | |
| 5,894,459 A | * | 4/1999 | Kurita et al. ............ 369/13.02 |
| 6,678,227 B1 | * | 1/2004 | Kondo et al. ............ 369/47.33 |

FOREIGN PATENT DOCUMENTS

| | | |
|---|---|---|
| EP | 0 560 600 A2 | 9/1993 |
| EP | 0 679 983 A2 | 11/1995 |
| EP | 0 974 966 A1 | 1/2000 |
| JP | 2-242326 | 9/1990 |
| JP | 10-49990 | 2/1998 |
| JP | 10-63433 | 3/1998 |
| JP | 2000-40302 | 8/2000 |

* cited by examiner

*Primary Examiner*—Muhammad Edun
(74) *Attorney, Agent, or Firm*—Dickstein Shapiro Morin & Oshinsky LLP

(57) ABSTRACT

An information recording apparatus that records information on a recording medium includes a write unit performing a write operation on the recording medium in which data continuity is maintained at an ending and an beginning point of writing information to the recording medium, a stop instruction unit instructing a temporary stop of the write operation during the write operation, a restart instruction unit instructing a restart of the write operation, and a write stop/restart control unit controlling the write unit to stop performing the write operation in response to an instruction of the temporary stop by said stop instruction unit and controlling the write unit to restart performing the write operation in response to an instruction of the restart by the restart instruction unit.

14 Claims, 6 Drawing Sheets

INFORMATION RECORDING APPARATUS, INFORMATION RECORDING SYSTEM AND INFORMATION RECORDING MEDIUM

This application is a continuation of application Ser. No. 09/862,325 (now allowed), filed May 23, 2001, now U.S. Pat. No. 6,599,207 the subject matter of which is incorporated by reference herein.

BACKGROUND OF THE INVENTION

1. Field of the Invention

The present invention relates to an information recording apparatus or an information recording system which can write information into a CD-R/RW (Compact Disk-Recordable/Rewritable), DVD-R/RW (Digital Versatile Disc-R/RW), magnetic optical disc, magnetic disc (such as a hard disc or a floppy disc), memory card (RAM), or tape and which can be used as a replaceable medium for a computer system. Further, the present invention relates to an information recording medium or a computer readable recording medium that stores a program causing a microcomputer or host to execute software.

2. Description of the Related Art

Generally, this kind of information recording apparatus is used as an external storage device of the host computer, and is connected to the host computer so that an information recording system can be configured. Write information that is to be written to a recording medium in the information recording apparatus is transferred from the host side. There are many cases where the bit rate at which write information is transferred to the information recording apparatus from the host differs from the recording rate at which information is written to the recording medium in the information recording apparatus. Typically, the recording rate at which information is recorded on the recording medium in the information recording apparatus is lower (slower) than the information transfer bit rate.

Therefore, the program on the user or host side is caused to wait at the time of recording data by the information recording apparatus. Particularly, in an information recording apparatus in which it takes a long time to record data, the program executed thereby may be caused to wait and the recording may fail in the end. This problem has become conspicuous in the recent situation in which the information recording apparatus needs a medium having a larger recording capacity.

The recording may fail because of various factors. For example, one factor relates to a situation in which the bit rate of write information from the host is different from the bit rate at which information is actually written. Another factor is involved in a situation in which another information recording apparatus is connected to the same communication path, so that the transfer bit rate cannot be settled. Yet another factor stems from error/bug included in OS or driver.

There are many proposals to cope with situations and problems as described above. These proposals primarily monitor a buffer memory provided in the information recording apparatus and temporarily stops write operation due to monitor results.

For example, Japanese Laid-Open Patent Application No. 2-242326 discloses an information recording apparatus configured as follows. When a given amount of recording data from the host is stored in a buffer, a data write operation from the buffer to a recording medium is started. When the buffer becomes full of recording data from the host, data loading from the host is stopped. When data in the buffer has been written into the recording medium by a given one-write data unit, the data load from the host is restarted.

Also, Japanese Laid-Open Patent Application No. 10-63433 discloses an information recording method and apparatus configured as follows. When data stored in a buffer becomes below a given storage amount, recording of process recording information is stopped within an in-recording recording unit that is a predetermined recording unit in which process recording information that is being recorded on an information recording medium is contained. When the detected amount of data stored in the buffer becomes equal to or greater than the given storage amount, the recording of process recording information on the information recording medium is restarted from the recording unit in which the process recording information to be time-serially recorded before the recording unit in recording is contained.

Further, the above application discloses the following. Particularly, in high-density optical discs, data is recorded in a dispersed fashion. If a "buffer under run" occurs, it would be very difficult to maintain continuity. It is therefore required to monitor the buffer and to temporarily stop recording and restart on the basis of the monitor results. That is, the writing will be interrupted unless write data is supplied by the host at a transfer rate equal to or higher than the recording rate of the information recording apparatus (optical disc drive). In this case, data can be no longer written additionally, so that the writing of data fails. A phenomenon as described above is generally called "buffer under run".

Taking into consideration the above buffer under run, Japanese Laid-Open Patent Application No. 10-49990 discloses an optical disc drive having the following first and second means (units). The first means is to perform a write operation directed to maintaining data continuity by CIRC (Cross Interleave Read Solomon) demodulation at the beginning and ending of data write with respect to an optical disc. The second means is to temporarily stop the write operation if data transfer from the host is not in time while data is being written to the optical disc and to restart the data write when a sufficient amount of data is transferred from the host. The above two means make it possible to normally reproduce data continuously even after restarting.

Japanese Laid-Open Patent Application No. 2000-40302 discloses a disc recording apparatus configured as follows. Recording of data on a disc is interrupted when a situation in which buffer under run may occur occurs. When the situation in which buffer under run may occur is avoided, recording is restarted from the position that continuous to the last recording data on the disc immediately before the recording is interrupted, so that data can be recorded continuously. The above proposal ensures continuity of recording data on the disc even when buffer under run occurs.

In the temporary stop of recording in any of the above-mentioned conventional manners, the buffer capacity is monitored. When the available buffer capacity becomes small, the recording of data on the recording medium is temporarily stopped and is then restarted automatically. The conventional temporarily stop of recording does not take into account users' circumstances and operating conditions of other application programs in the computer system (information recording system). For example, these individual factors are not used to temporarily stop recording or allow another job to be executed by interruption. Therefore, the conventional temporarily stop of recording is not flexible. Further, intentional stop of recording is not permitted. The commercial power source is therefore required to always work and supply electricity. A battery cannot be used as power source of the computer system. This leads to a low flexibility of the conventional temporary stop.

SUMMARY OF THE INVENTION

It is therefore an object of the present invention to provide an information recording apparatus, information recording system and information recording medium enabling intentional stop and restarting of recording while data can-be temporarily stopped and restarted and can be read continuously.

Another object of the present invention is to provide an information recording apparatus, information recording system and information recording medium in which a power supply can be turned OFF in response to temporary stop of recording so that the flexibility of recording can be improved.

Yet another object of the present invention is to provide an information recording apparatus, information recording system and information recording medium which allows another job to be executed by interruption so that the flexibility of recording can be improved.

A further object of the present invention is to provide an information recording apparatus, information recording system and information recording medium which allows the use of a battery as power source so that the portability and flexibility can be improved.

These objects of the present invention are achieved by an information recording apparatus that records information on a recording medium including: a write unit performing a write operation on the recording medium in which data continuity is maintained at an ending and an beginning point of writing information to the recording medium; a stop instruction unit instructing a temporary stop of the write operation during the write operation; a restart instruction unit instructing a restart of the write operation; and a write stop/restart control unit controlling the write unit to stop performing the write operation in response to an instruction of the temporary stop by said stop instruction unit and controlling the write unit to restart performing the write operation in response to an instruction of the restart by the restart instruction unit.

The above information recording apparatus is equipped with the write unit that performs a write operation on the recording medium in which data continuity is maintained at an ending and an beginning point of writing information to the recording medium. It is therefore possible to continuously reproduce data later even after the write operation is temporary stopped and restarted. In addition, the information recording apparatus includes: a stop instruction unit instructing a temporary stop of the write operation during the write operation; a restart instruction unit instructing a restart of the write operation; and a write stop/restart control unit controlling the write unit to stop performing the write operation in response to an instruction of the temporary stop by said stop instruction unit and controlling the write unit to restart performing the write operation in response to an instruction of the restart by the restart instruction unit. It is therefore possible to intentionally stop and restart the write operation at an arbitrary timing. This makes it possible to intentionally stop information recording on the basis of an operating state of another application program and a user's specific circumstance.

The information recording apparatus thus configured enables highly flexible recording.

The above can be realized by an information recording apparatus that collaborates with a computer readable recording medium for storing a program used in an information recording apparatus that includes a microcomputer and records information on the computer readable recording medium, said program causing the microcomputer to execute the steps of: (a) performing a write operation on the recording medium in which data continuity is maintained at an ending and an beginning point of writing information to the recording medium; (b) instructing a temporary stop of the write operation during the write operation; (c) instructing a restart of the write operation; and (d) controlling the step (a) to stop performing the write operation in response to an instruction of the temporary stop by the step (b) and controlling the step (a) to restart performing the write operation in response to an instruction of the restart by the step (c). This program is loaded to a computer so that the above-mentioned information recording apparatus can be implemented.

The information recording apparatus may be configured so that it further includes a saving unit saving information about a state of the write operation obtained at the time of temporarily stopping the write operation of the write unit by the write stop/restart control unit.

Hence, even if the write operation is intentionally stopped at an arbitrary timing, information about the state at that time can be saved in the non-volatile memory. The information is used when the write operation is restarted. Hence, it is possible to realize the write operation so that information is continuous before and after the temporary stop. Even when power supply is turned OFF, the continuity of data can be ensured by using the state information stored in the non-volatile memory.

The above can be realized by the information recording apparatus that collaborates with the above-mentioned recording medium may be configured so that the recording medium further includes a program that causes the microcomputer to execute a step of saving, in a nonvolatile memory, information about a state of the write operation obtained at the time of temporarily stopping the write operation by the step (d).

The information recording apparatus may be configured so that it further comprises: an interrupt instruction unit instructing an interrupt process when the write unit is temporarily stopping the write operation; and an interrupt processing unit performing the interrupt process in response to an instruction of the interrupt process by the interrupt instruction unit.

Even if the write operation is intentionally stopped any time, information about the state at that time can be saved in the, non-volatile memory. The information is used when the write operation is restarted. Hence, it is possible to realize the write operation so that information is continuous before and after the temporary stop. This allows another job to be executed by interrupt. After the interrupt process is finished, the write operation can be restarted.

The above can be realized by the information recording apparatus that collaborates with a program that causes the microcomputer to execute the steps of: (e) instructing an interrupt process when the write unit is temporarily stopping the write operation; and (f) performing the interrupt process in response to an instruction of the interrupt process by the step (e).

The information recording apparatus may be configured so that the interrupt processing unit comprises a plurality of LSI chips that are arranged in a multiple formation and operate selectively. It is therefore possible to easily realize a structure that causes the microcomputer to handle the interrupt process in a state that the write operation waits for restarting after the temporary stop.

The information recording apparatus may be configured so as to further include a battery as a power source. The information recording apparatus has high resistance to fault resulting from the employment of the mechanism which allows the write operation to be stopped any time. Hence, the battery can be used as a power source, so that the information recording apparatus is highly portable.

The information recording apparatus may be configured so that the stop instruction unit and the restart instruction unit comprise key buttons. Thus, it is easy for the user to intentionally input instructions of temporary stop and restart.

The information recording apparatus may be configured so that it further comprises a detection unit that detects an available capacity that remains in the battery, wherein the stop instruction unit uses a temporary stop signal generated by the detection unit when the available capacity becomes equal to or lower than a predetermined threshold level, and a restoration signal generated by the detection unit when the available capacity is restored. It is therefore possible to make temporary stop before the remaining capacity of the battery becomes short and cause the write operation to wait for restoration.

The above can also be realized by the information recording apparatus which collaborates with a computer readable recording medium that stores a program that causes the microcomputer to execute a step (e) of detecting an available capacity that remains in the battery, wherein the step (b) uses a temporary stop signal generated by the step (e) when the available capacity becomes equal to or lower than a predetermined threshold level, and a restoration signal generated by the step (e) when the available capacity is restored.

The above-mentioned objects of the present invention are also achieved by an information recording system comprising: an information recording apparatus recording information on a recording medium; and a host that transfers the information to the information recording apparatus, a write unit performing a write operation on the recording medium in which data continuity is maintained at an ending and an beginning point of writing information to the recording medium; a stop instruction unit instructing a temporary stop of the write operation during the write operation; a restart instruction unit instructing a restart of the write operation; and a write stop/restart control unit controlling the write unit to stop performing the write operation in response to an instruction of the temporary stop by said stop instruction unit and controlling the write unit to restart performing the write operation in response to an instruction of the restart by the restart instruction unit.

The above information recording system is equipped with the write unit that performs a write operation on the recording medium in which data continuity is maintained at an ending and an beginning point of writing information to the recording medium. It is therefore possible to continuously reproduce data later even after the write operation is temporary stopped and restarted. In addition, the information recording system includes: a stop instruction unit instructing a temporary stop of the write operation during the write operation; a restart instruction unit instructing a restart of the write operation; and a write stop/restart control unit controlling the write unit to stop performing the write operation in response to an instruction of the temporary stop by said stop instruction unit and controlling the write unit to restart performing the write operation in response to an instruction of the restart by the restart instruction unit. It is therefore possible to intentionally stop and restart the write operation at an arbitrary timing. This makes it possible to intentionally stop information recording on the basis of an operating state of another application program and a user's specific circumstance. The information recording system thus configured enables highly flexible recording.

The above can also be realized by the information recording system that collaborates with a computer readable recording medium for storing a program used in an information recording system comprising an information recording apparatus recording information on a recording medium, and a host that transfers the information to the information recording apparatus, said program causing the host to execute the steps of: (a) performing a write operation on the recording medium in which data continuity is maintained at an ending and an beginning point of writing information to the recording medium; (b) instructing a temporary stop of the write operation during the write operation; (c) instructing a restart of the write operation; and (d) controlling the step (a) to stop performing the write operation in response to an instruction of the temporary stop by the step (b) and controlling the write unit to restart performing the write operation in response to an instruction of the restart by the step (c).

The information recording system may be configured so that it further comprises a saving unit saving, in a non-volatile memory, information about a state of the write operation obtained at the time of temporarily stopping the write operation of the write unit by the write stop/restart control unit.

Hence, even if the write operation is intentionally stopped at an arbitrary timing, information about the state at that time can be saved in the nonvolatile memory. The information is used when the write operation is restarted. Hence, it is possible to realize the write operation so that information is continuous before and after the temporary stop. Even when power supply is turned OFF, the continuity of data can be ensured by using the state information stored in the non-volatile memory.

The above can also be realized by the information recording system that collaborates with a computer readable recording medium that further comprises a program that causes the host to execute a step of saving, in a non-volatile memory, information about a state of the write operation obtained at the time of temporarily stopping the write operation of the write unit by the step (d).

The information recording system may be configured so as to it further comprise: an interrupt instruction unit instructing an interrupt process when the write unit is temporarily stopping the write operation; and an interrupt processing unit performing the interrupt process in response to an instruction of the interrupt process by the interrupt instruction unit.

Even if the write operation is intentionally stopped any time, information about the state at that time can be saved in the non-volatile memory. The information is used when the write operation is restarted. Hence, it is possible to realize the write operation so that information is continuous before and after the temporary stop. This allows another job to be executed by interrupt. After the interrupt process is finished, the write operation can be restarted.

The above can also be realized by the information recording system that collaborates with a computer readable recording medium that further comprises a program that causes the host to execute a step (e) of detecting an available capacity that remains in the battery, wherein the step (b) uses a temporary stop signal generated by the step (e) when the available capacity becomes equal to or lower than a predetermined threshold level, and a restoration signal generated by the step (e) when the available capacity is restored.

The information recording system may be configured so that the stop instruction unit and the restart instruction unit comprise key buttons. Hence, it is easy for the user to intentionally input the instructions of temporary stop and restart.

BRIEF DESCRIPTION OF THE DRAWINGS

Other objects, features and advantage of the present invention will become more apparent from the following detailed description when read in conjunction with the accompanying drawings, in which:

FIG. 3 is a schematic flowchart of a process control executed at the time of power ON;

DESCRIPTION OF THE PREFERRED EMBODIMENTS

Figure 1:
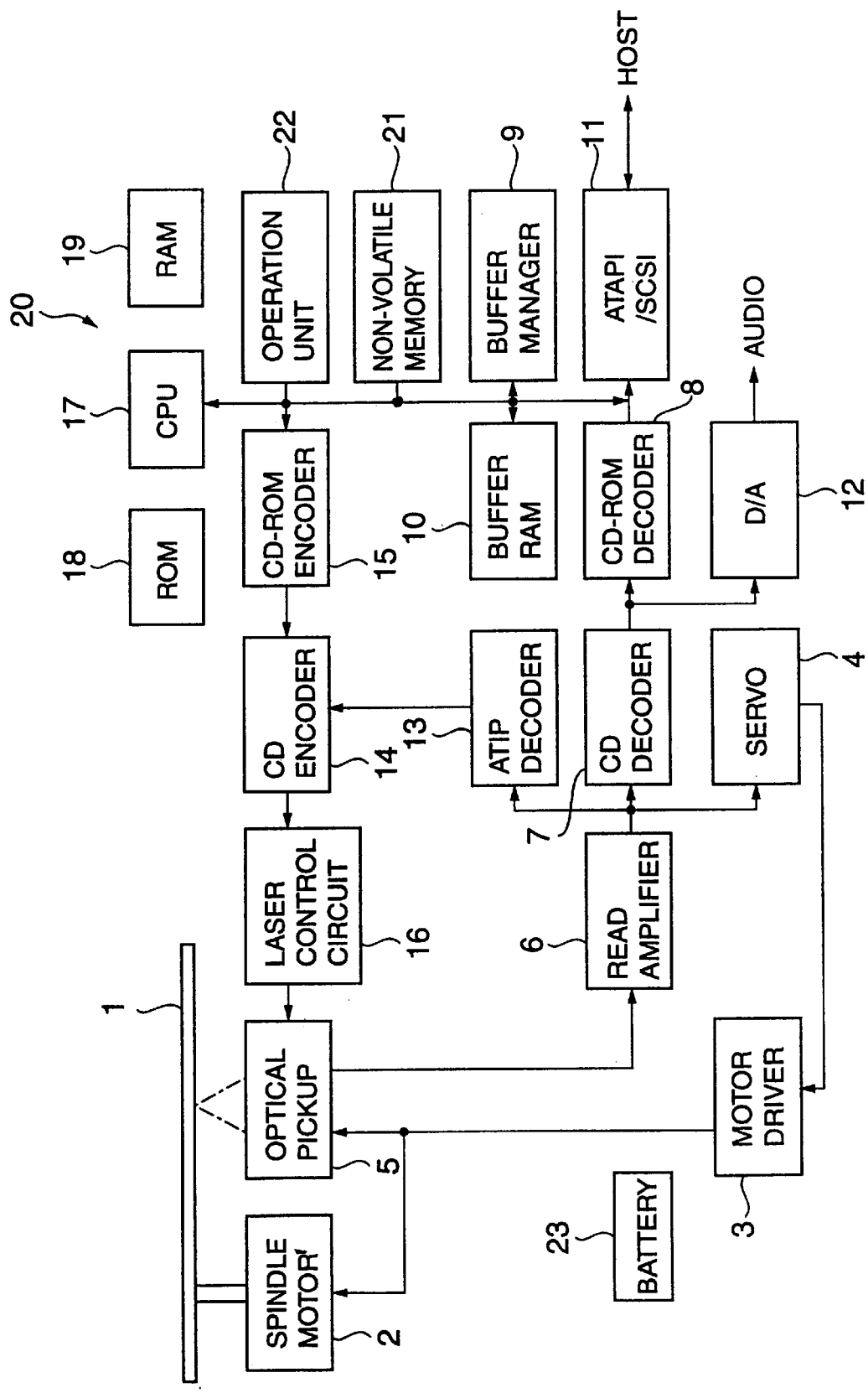
FIG. 1 is a block diagram of a drive apparatus according to a first embodiment of the present invention.
Figure 2:
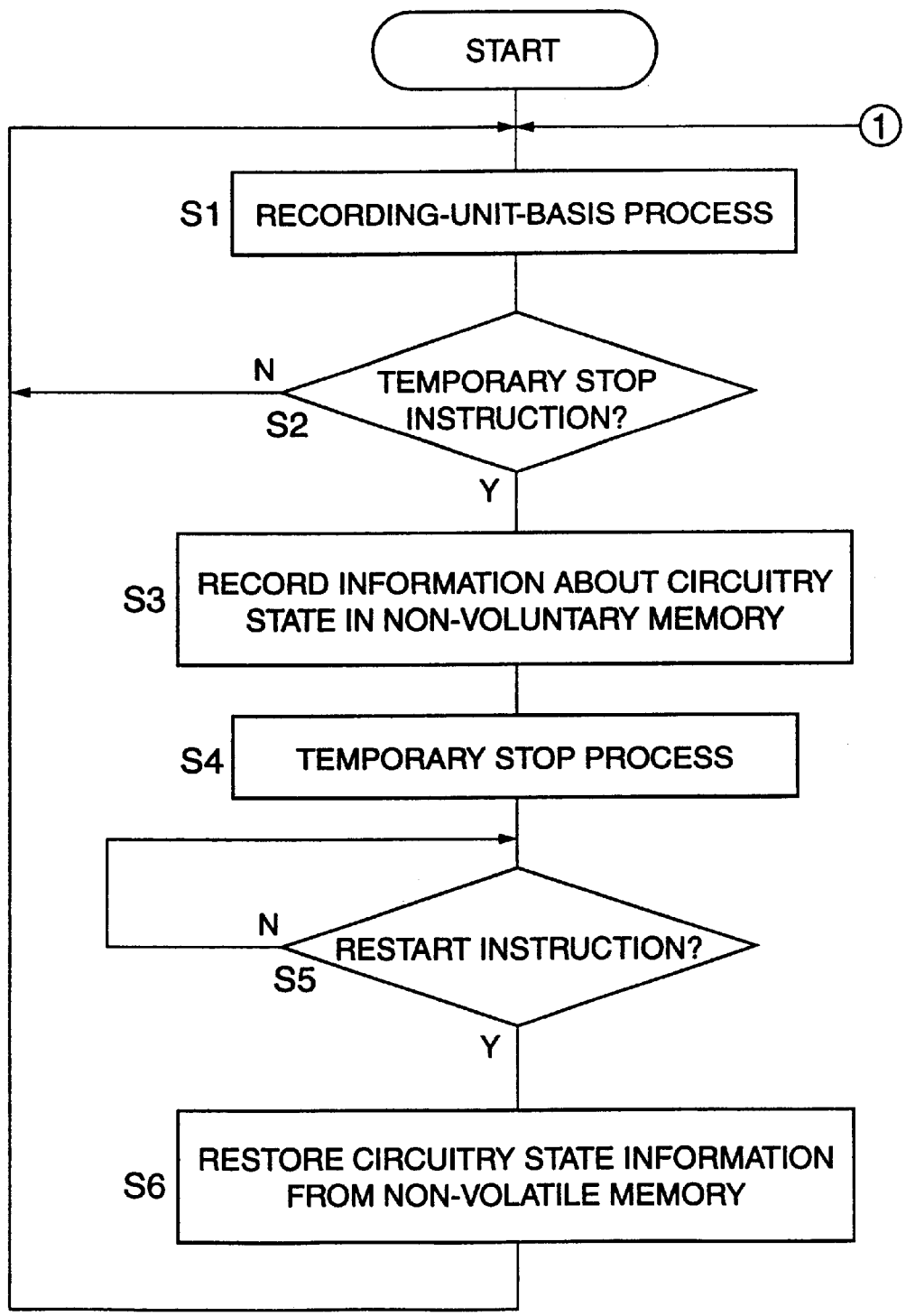
FIG. 2 is a schematic flowchart of an interrupt control process executed in the drive apparatus shown in FIG. 1.
Figure 3:
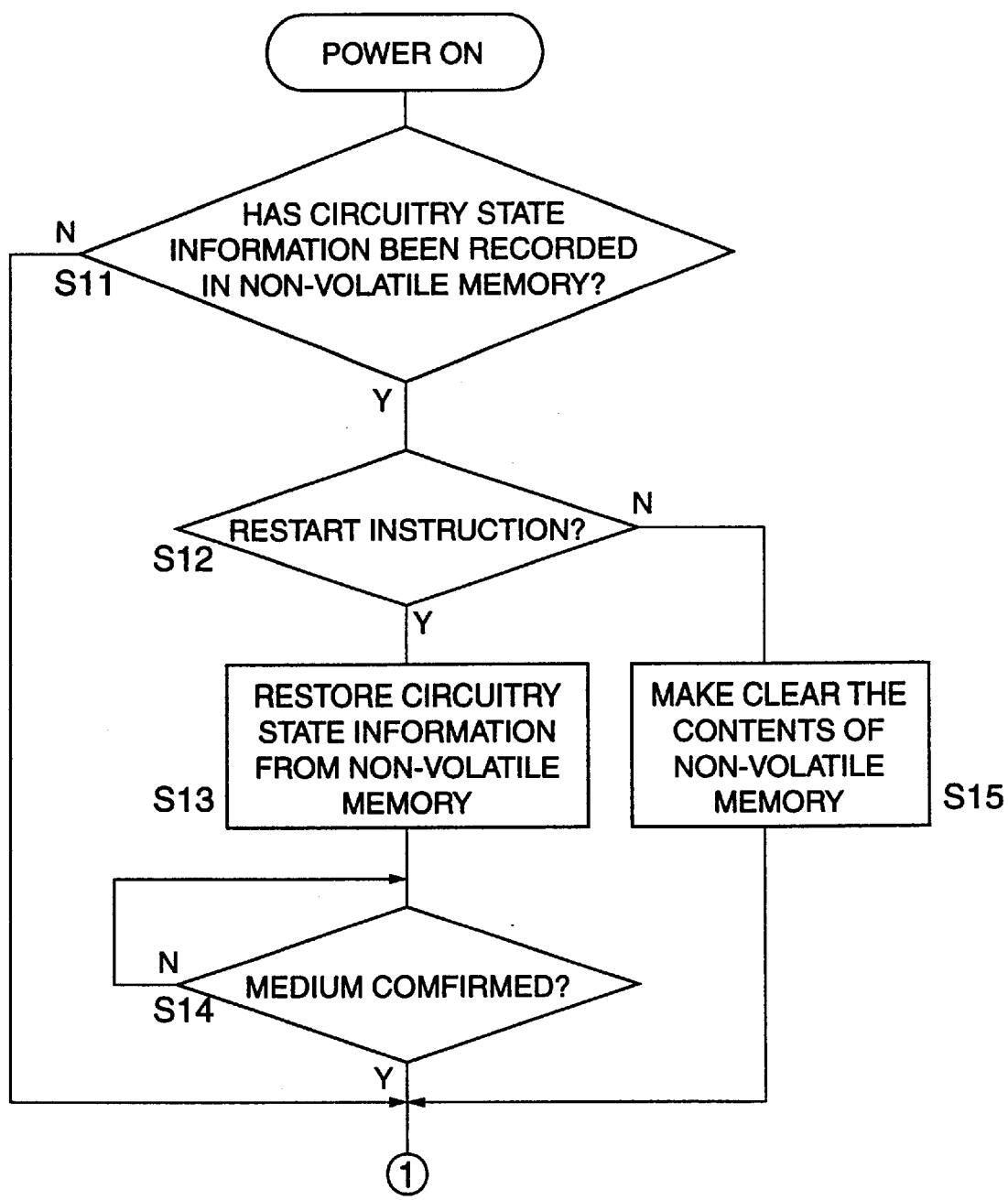
Figure 4:
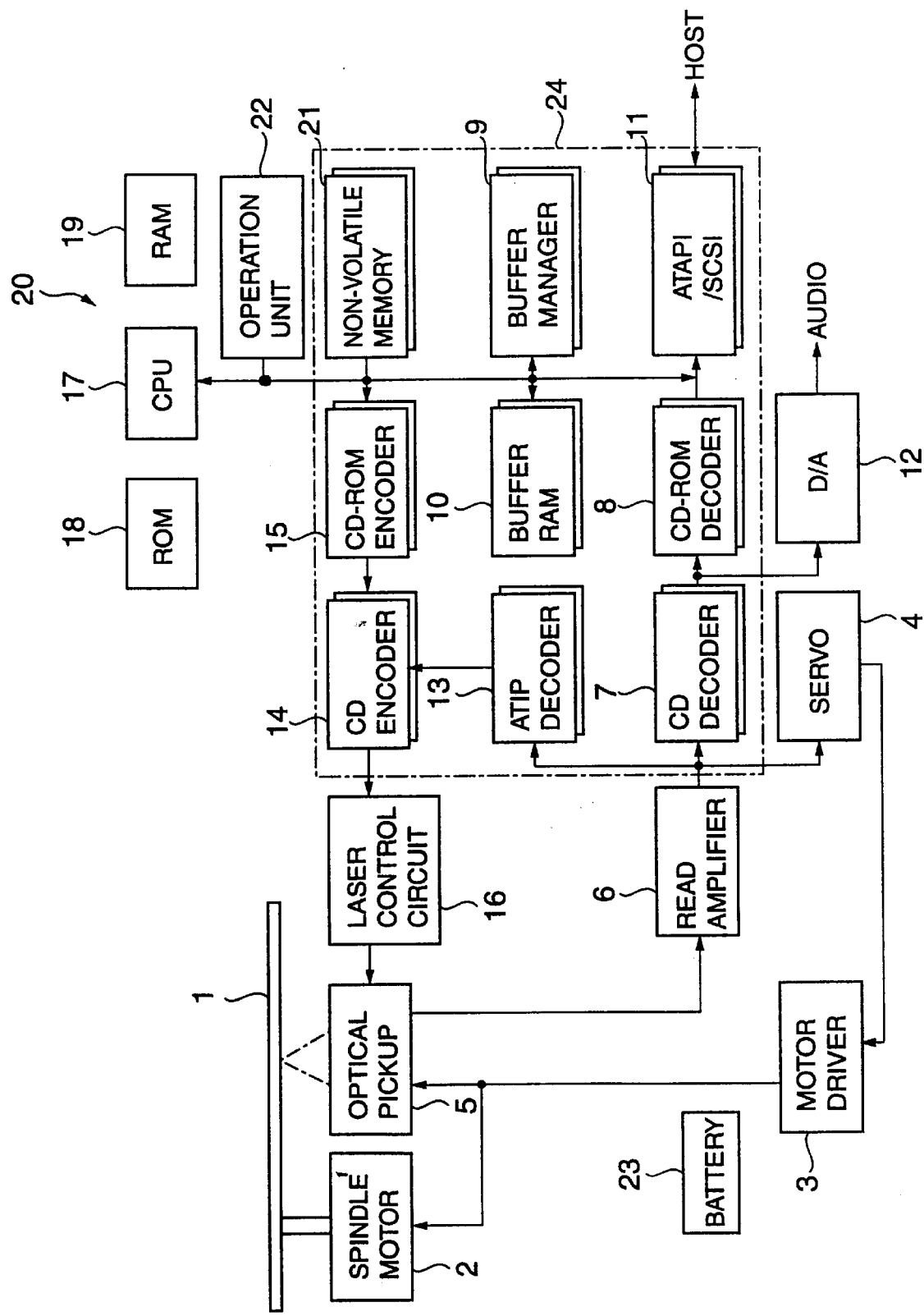
FIG. 4 is a block diagram of a duplicated configuration of a control-system LSI part.

A description will be given, with reference to FIGS. 1 through 3, of a first embodiment of the present invention. An information recording apparatus according to the first embodiment of the present invention is applied to an information recording/reproducing apparatus capable of handing a CD-R/RW 1, which is a recordable optical disc used as an information recording medium. FIG. 1 is a schematic block diagram of a configuration of the information recording/reproducing apparatus (drive apparatus).

The optical disc 1 is rotationally driven by a spindle motor 2, which is controlled by a motor driver 3 and a servo unit 4 so that the optical disc 1 can be rotated at a constant linear velocity (CLV). An optical pickup 5 includes a semiconductor laser diode, an optical system, a focusing actuator, a tracking actuator, a light-receiving element, a position sensor and so on, and projects a laser beam onto a recording surface of the optical disc 1.

The optical pickup 5 can be moved in a sledge direction (radial direction of the optical disc 1) by a seek motor. The embedded focusing actuator, tracking actuator and seek motor are controlled by the motor driver 3 and the servo unit 4 that use signals obtained from the embedded light-receiving element and position sensor so that the laser spot can be placed at a target position on the optical disc 1.

At the time of data reproduction, a reproduced signal obtained by the optical pickup 5 is amplified and binarized by a read amplifier 6, and is subjected to a de-interleaving and error correction process in a CD decoder 7. Data after the de-interleaving and error correction process is input to a CD-ROM decoder 8, which performs an error correction process directed to enhancing the reliability of data.

Then, data processed by the CD-ROM decoder 8 is stored in a buffer RAM 10 by a buffer manager 9. When an sufficient amount of data to form sector data becomes available, the data is transferred to the host side via an ATAPI/SCSI interface 11 at one time. Audio data that is output from the CD decoder 7 is applied to a D/A converter 12, which produces an analog audio signal.

At the time of data recording, data transferred from the host is received via the ATAPI/SCSI interface 11, and is stored in the buffer RAM 10 by the buffer manager 9.

The write operation is initiated when a certain amount of data is stored in the buffer RAM 10. Before the write operation is initiated, the laser spot is positioned in a write starting point, which can be obtained using a Wobble signal that has been inscribed on the optical disc by a meandering track. The Wobble signal includes absolute time information called ATIP, which is extracted by an ATIP decoder 13.

A synchronizing signal generated by the ATIP decoder 13 is input to a CD encoder 14, which enables data to be written at correct position. The data in the buffer RAM 10 is processed by a CD-ROM encoder 15 and a CD encoder 14. For example, an error correction code is added to the data stored in the buffer RAM 10, and the data with error correction code added is interleaved. The output data of the CD encoder 14 is recorded on the optical disc 1 via a laser control circuit 16 and the optical pickup 5.

The drive apparatus thus configured is equipped with a microcomputer, which includes a CPU 17, a ROM 18 and a RAM 19. The CPU 17 controls the operations of the above-mentioned structural components and executes various functions, which will be described later. A nonvolatile RAM 21 formed of a non-volatile RAM is connected to the CPU 17 via a bus. The drive apparatus is equipped with an operation unit 22, which may include a key button and an interrupt button. The key button includes an eject button and a temporary stop instruction button that function as stop instruction means (unit) and restart instruction means (unit). The interrupt button functions as interrupt instruction means (unit).

In addition to the ROM 18 and RAM 19, the present embodiment of the invention may use, as information recording media capable of providing the CPU 17 with a prerecorded program (software or application program), a CD-ROM storing data that can be reproduced by the optical pickup 5. The CD-ROM can be removably loaded to the drive apparatus.

The drive apparatus of the present embodiment of the invention uses specific software, namely control programs for causing the CPU 17 to execute various process operations. The control programs may be recorded on a CD-ROM beforehand. When such a CD-ROM is loaded to the drive apparatus, the control programs are reproduced and installed in the ROM 18. When the drive apparatus is activated, the control programs are read from the ROM 18 and are transferred in the RAM 19. The CPU 17 reads the control programs stored in the RAM 19.

As described above, the CPU 17 reads the various control programs and execute corresponding data processes, so that various functions that will be described later can be realized as various means (units).

A description will be given, with reference to FIGS. 2 and 3, of a control of a write operation executed under the control of the CPU 17. Write operation is based on a recording-unit process by the function of the write means (step S1). More particularly, at step S1, the write means functions to record and reproduce data on and from the recordable optical disc 1 and to enable data to be written to the optical disc 1 so that data continuity can be maintained at the ending and beginning of data write. The above function may primarily be executed by a method disclosed in Japanese Laid-Open Patent Application No. 10-49990. More specifically, the CPU 17 receives a temporary stop signal responsive to operation of the temporary stop instruction button, and interrupts supply of a clock to the CD-ROM encoder 15 and a CIRC encoder (not shown), which encoders stop encoding and outputting write data. Further, the CPU 17 masks a write gate to interrupt (temporarily stop) the actual write operation on the optical disc 1. However, data on the way of encoding is stored in RAMs (not shown) of the CD-ROM encoder 15 and the CIRC encode (not shown) as it is. Thus, when the temporary stop signal is turned OFF (by the restart signal), the data in the above RAMs is continuously output as write data, and the write operation on the optical disc 1 is restarted together with release of the mask. At that time, the temporary stop and restart of data write is precisely synchronized with the temporary stop signal. Thus, data write can be realized in which data continuity can be maintained at the ending and beginning of data write. Alternatively, the write means may be implemented by a manner of ensuring continuity of recording data described in Japanese Laid-Open Patent Application No. 2000-40302.

Each time the recording-unit-basis process is finished, the CPU 17 checks whether the temporary stop instruction has been issued (S2). In the present embodiment, the temporary stop instruction may be made so that the user depresses the eject button or the temporary stop button provided in the operation unit 22 at an arbitrary time during the recording operation. If the instruction of temporary stop has not been issued (N at S2), the recording-unit-basis process is repeated. If the instruction of temporary stop has been issued (Y at S2), the recording condition and the circuitry states of the CPU 17 and the encoders 14 and 15 formed of respective LSI chips are stored and saved in the non-volatile RAM 21 (S3). The process of step S3 is executed as the function of saving means (unit). After saving, the CPU 17 temporarily stops the spindle motor 2, thee optical pickup 5 mechanically (S4). The process of step S4 is executed as part of write stop/restart control means (unit).

The CPU 17 waits for the restart instruction in the temporary stop state (S5). In the present embodiment, the instruction of restart is made by depressing the eject button or the temporary stop button in the operation unit 22 again (release operation). When the restart instruction has been made (Y of S5), the circuitry states saved in the non-volatile RAM 21 are restored (S6). Thus, the recording operation is restarted in the state obtained at the time of temporary stop (S1). The process of step S6 is executed as part of the write stop/restart control means.

The power supply may be turned OFF in the state in which the CPU 17 waits for the restart instruction (S5). When the power supply is turned ON from the normal power OFF state or the state of step S5, the flowchart shown in FIG. 3 is activated. After power ON, the CPU 17 checks whether information about the circuitry state has bee saved in the non-volatile RAM 21 (S11). If the answer of step S11 is NO, the CPU 17 recognizes that the power supply was turned ON from the normal power OFF, and causes the associate means (units) to execute the regular recording operation starting from step S1. In contrast, if it is determined that the circuitry state has been saved in the non-volatile RAM 21, the CPU 17 recognizes that the power supply was turned OFF in the state of temporary stop and waits for the instruction of restart (S12). When the restart instruction is made by the operation unit 22 (Y of S12), the CPU 17 causes information about the circuitry state saved in the nonvolatile RAM 21 to be restored as in the case of step S6 (S13). Then, the CPU 17 determines whether the loaded optical disc 1 was loaded at the time of temporary stop (S14). When the answer of step S14 is YES, the CPU 17 causes the recording operation to restart in the state obtained at the time of temporary stop. The processes of steps S13 and S14 are executed as part of the write stop/restart control means.

When the restart instruction is not made (N of S12: when a concrete restart releasing instruction or normal execution instruction is made), the CPU 17 makes clear the contents of the non-volatile RAM 21 (S15), and causes the associated means (units) to perform the normal recording operation starting from step S1.

In the present embodiment of the invention, a battery 23 is used as a power source of the drive apparatus, which is equipped with means (unit) for detecting the remaining capacity of the battery 23. If the available capacity that remains in the battery 23 becomes equal to or less than a predetermined threshold level, the CPU 17 issues an alarm and causes the ATAPI/SCSI interface 11 or another internal circuit to generate the temporary stop signal. This temporary stop signal may be used as the temporary stop instruction at step S2. When the CPU 17 is notified that the available capacity that remains in the battery 23 has been restored due to battery replacement, the CPU 17 causes the ATAPI/SCSI interface 11 or another internal circuit to generate the restoration signal. This restoration signal may be used as the restart instruction at step S5 for restarting the recording operation.

In the present embodiment of the invention, an interrupt process using another optical disc 1 may be executed in the state in which the CPU 17 waits for the restart instruction at step S5. More particularly, although process control is not specifically illustrated, the desired type of optical disc 1 is loaded to the spindle motor 2, and the interrupt button of the operation unit 22 is operated so that the interrupt instruction is issued. The CPU 17 causes the interrupt process means to execute a desired interrupt process such as recording or reproduction with regard to the optical disc 1. After the interrupt process is finished, the CPU 17 checks whether the original optical disc 1 is loaded again (S14), and causes the corresponding recording operation to be restarted.

A toggle structure may be useful to simply perform the above interrupt process. A plurality of identical LSI chips (for example, two identical LSI chips) are mounted and arranged in a multiple formation (for example, duplex formation. For example, the following components of the LSI chip 24 other than the mechanical control may be doubled: CD decoder 7, CD-ROM decoder 8, buffer manager 9, the buffer RAM 10, ATAPI/SCSI 11, CD encoder 14, CD-ROM encoder 15 and the non-volatile RAM 21. When the temporary stop instruction is issued, the CPU 17 temporarily stops one of each of the doubled components of the LSI chip 24 that was used up to the time when the temporary stop instruction is issued, and saves the current state thereof. Instead, the CPU 17 activates the other one of each of the doubled components in order to process the interrupt. In this manner, the doubled components are alternately used in toggle formation.

When information about the states of the LSI chips is saved in the non-volatile RAMs 21, it is not lost because of power OFF.

Figure 5:
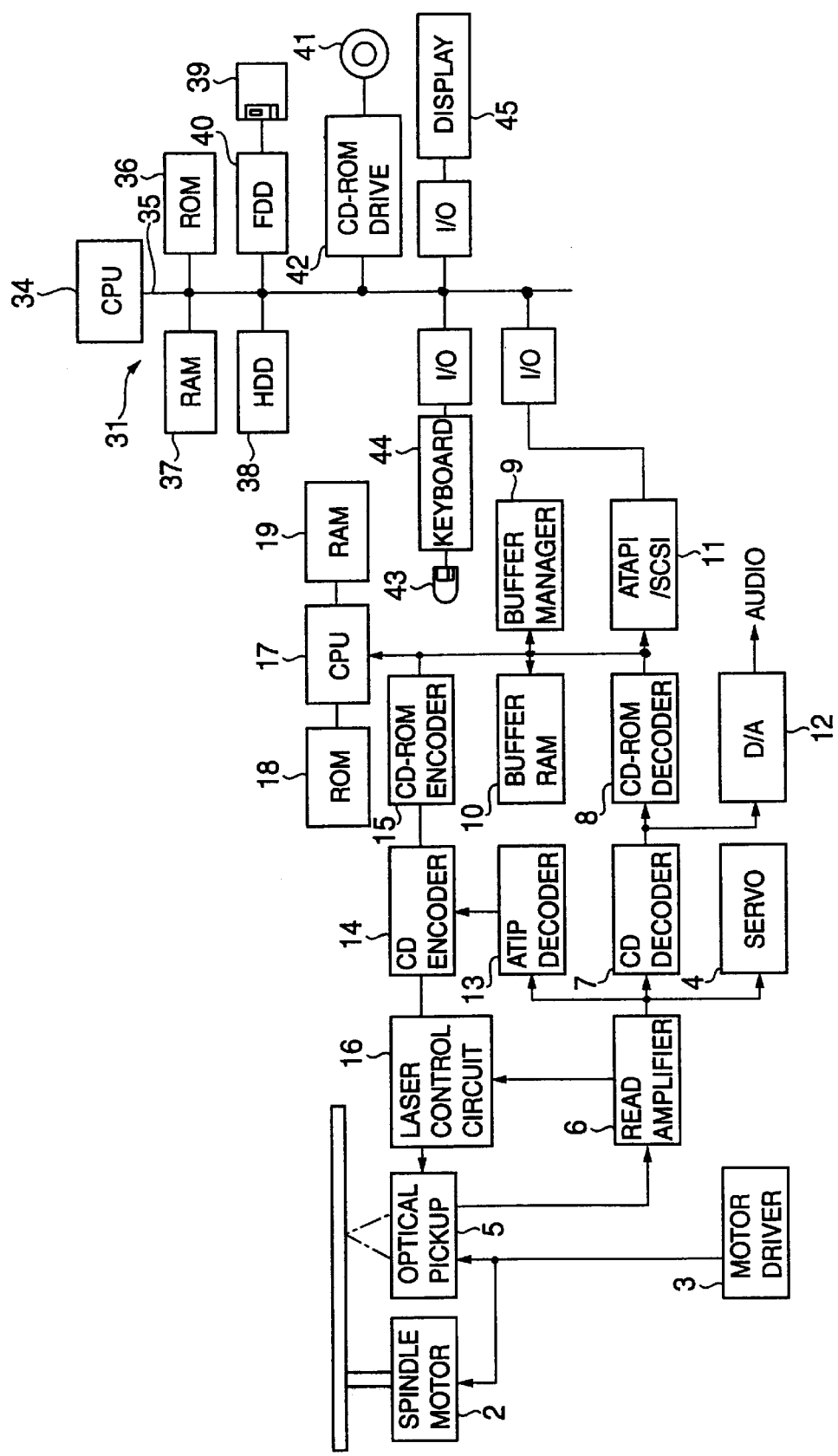
FIG. 5 is a block diagram of an optical disc system according to a second embodiment of the present invention.

A description will now be given, with reference to FIG. 5, of a second embodiment of the present invention, which is applied to an information recording system including a host computer 31. That is, the second embodiment of the invention is configured so that the host 31 is connected to the drive apparatus (information recording apparatus) 32 like the first embodiment of the invention. The control function in the first embodiment of the present invention is executed by the host 31. Schematically, the second embodiment of the present invention is made up of a drive apparatus 32 that actually reads and reproduces data on and from the optical disc 1, and the host 31 that includes a general-purpose computer that is provided separate from the drive apparatus 32 and transfers write data to the drive apparatus 32.

The host 31 may have an arbitrary configuration. FIG. 5 illustrates an example of the hardware structure. The host 31 includes a CPU 34 to which are connected a ROM 36, a RAM 37, an HDD (Hard Disc Drive) 38, an FDD 40 into which an FD 39 is loaded, a CD-ROM drive 42 into which a CD-ROM 41 is loaded, a keyboard 44 to which a mouse 43 is connected, a display 45 and the optical disc drive 32 via a bus line 35.

The host 31 has the drives 40 and 42, the mouse 43 and the keyboard 44 as data input devices that receive external input of various types of data. Particularly, predetermined key buttons in the keyboard 44 also function as stop instruction means (unit), restart instruction means or interrupt instruction means (unit), these means being operated by the user. As data output devices for externally outputting the various types of data, the host 31 includes the FDD 40 and the display 45 in addition to the optical disc 1. As data storage devices that temporarily store various types of data, the host 31 includes the RAM 37, HDD 38 and FD 39. As information storage media from which programs (software or application programs) can be provided to the CPU 34, the host 31 includes the ROM 36, RAM 37, HDD 38, FD 39 and CD-ROM 41. Further, though not illustrated, these information storage media may be MO, MD, CD/R/RW, DVD-R/RW and memory card.

The control programs that cause the CPU 34 to execute the various process operations (for example, the control processes shown in FIGS. 2 and 3) are preinstalled in, for example, CD-ROM 41 as software of the host 31. The software is preinstalled in the HDD 38, and a copy thereof is made when the host 31 is initiated and is read by the CPU 34.

As described above, the CPU 34 reads the various programs and executes the corresponding data processes, so that various means (units) such as the aforementioned write means and write stop/restart control means (units) can be implemented through the drive apparatus 32.

Figure 6:
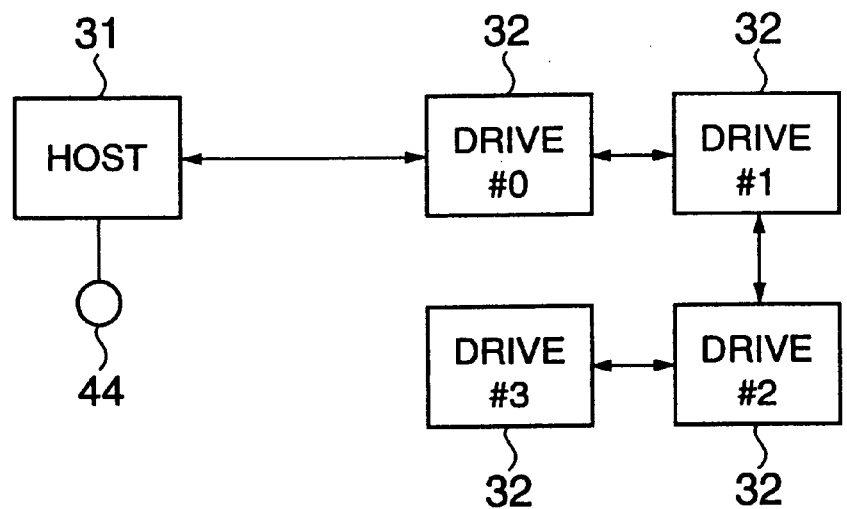
FIG. 6 is a diagram of a system configuration using a dizzy chain formation.
Figure 7:
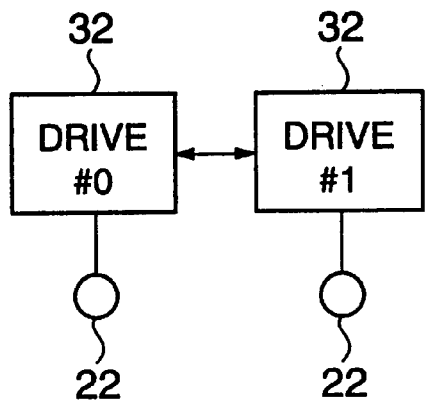
FIG. 7 is a diagram of a system configuration of another embodiment of the invention.

The above-mentioned second embodiment of the present invention is the information recording system in which the drive apparatus 32 and the host 31 are connected so as to make the 1:1 connection relationship. Alternatively, as shown in FIG. 6, the present invention includes a system configuration in which a plurality of drive apparatuses 32 (#0–#3) are connected to the host 31 in a dizzy chain formation. In this case, the input device such as the keyboard 44 of the host 31 is used as the stop instruction means, so that the temporary stop instruction can be issued against any of the drive apparatuses 32 (#0–#3: which may have an identical configuration or different configurations) that are currently in recording operation any time. Also, as shown in FIG. 7, the present invention includes a configuration in which a plurality of drive apparatuses 32 (#0–#1) that are currently in recording operation are mutually connected. In this case, as has been described with regard to the first embodiment of the present invention, the key buttons such as the eject button and the temporary stop button of the operation unit 22 provided in each of the drive apparatuses 32 (#0–#1) are used as the temporary stop means operated by the user. This makes it possible to intentionally stop the recording operation any time.

The above-mentioned embodiments of the present invention are the information recording apparatus or information recording system in which the CD-R/RW is used as the optical disc 1. However, the present invention includes any information recording apparatus that handles a recordable recording medium into which information can be written. For example, the present invention includes an information recording apparatus that handles an FD.

The present invention is not limited to the specifically disclosed embodiments, and variations and modifications may be made without departing from the scope of the present invention.

The present application is based on Japanese priority application no. 2000-155582 filed on May 26, 2001, the entire contents of which are hereby incorporated by reference.

What is claimed is:

1. An information recording system comprising:
   a host, for outputting a data to be recorded; and
   a data recording apparatus for recording the data, said data recording apparatus further comprising,
   a buffer, for storing the data;
   an encoder, for receiving the data from the buffer and encoding the data into encoded data suitable for recording; and
   a recorder for recording encoded data to a media unit;
   wherein after said host temporarily pauses outputting the data, said data recording apparatus pauses said encoder while maintaining encoded data, and said data recording apparatus pauses said recorder.

2. The system of claim 1, wherein said data recording apparatus pauses said encoder after said buffer contains less than a predetermined amount of the data.

3. The system of claim 1, wherein said data recording apparatus does not write any run-out blocks when paused.

4. The system of claim 1, wherein said data recording apparatus resumes operation of said encoder after said host resumes outputting the data.

5. The system of claim 4, wherein said data recording apparatus resumes operation of said recorder after said buffer contains more than a predetermined amount of data.

6. The system of claim 5, wherein said recorder does not write any run-in blocks when resuming operation.

7. The system of claim 1, wherein said host temporarily pauses outputting the data due to a user instruction.

8. A method of operating a data recording apparatus, comprising:
   receiving data to be recorded from a host;
   transferring said data to a buffer;
   moving said data from the buffer to an encoder;
   encoding said data to produce encoded data;
   recording said encoded data on a media;
   pausing said receiving of data; and
   after said step of receiving data is paused, pausing said encoding while maintaining encoded data and pausing said recording.

9. The method of claim 8, wherein said step of pausing said encoding occurs when said buffer has less than a predetermined amount of the data.

10. The method of claim 8, wherein said step of recording does not record any run-out blocks when paused.

11. The method of claim 8, further comprising the step of:

after resuming said step of receiving, resuming said step of encoding.

12. The method of claim 11, further comprising the step of:

after said buffer exceeds a predetermined capacity, resuming said step of recording.

13. The method of claim 12, wherein said recorder does not write any run-in blocks when resuming said step of recording.

14. The method of claim 8, wherein said step of host temporarily pausing the outputting the data is due to a user instruction.

* * * * *